(No Model.)
J. B. WARING.
FEEDER FOR PULVERIZING MACHINES.
No. 357,435. Patented Feb. 8, 1887.
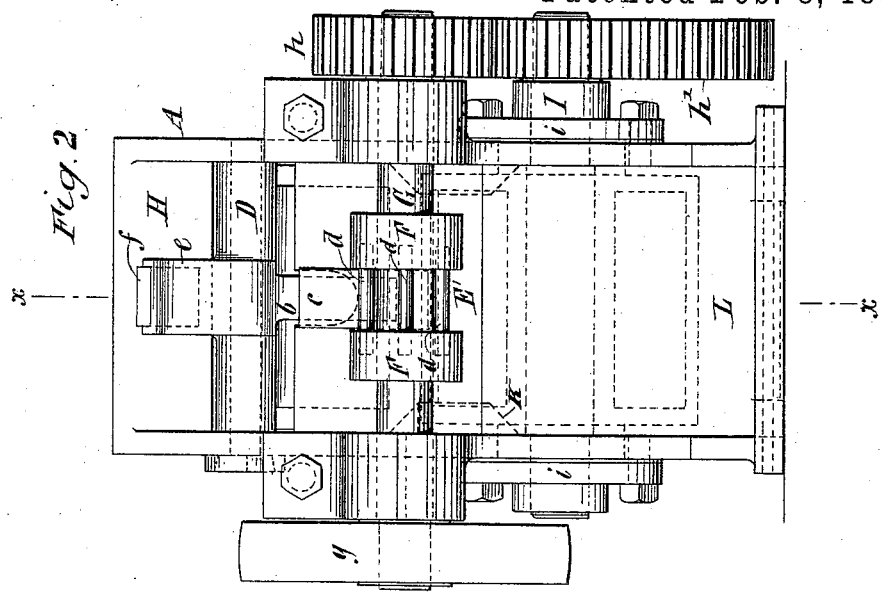
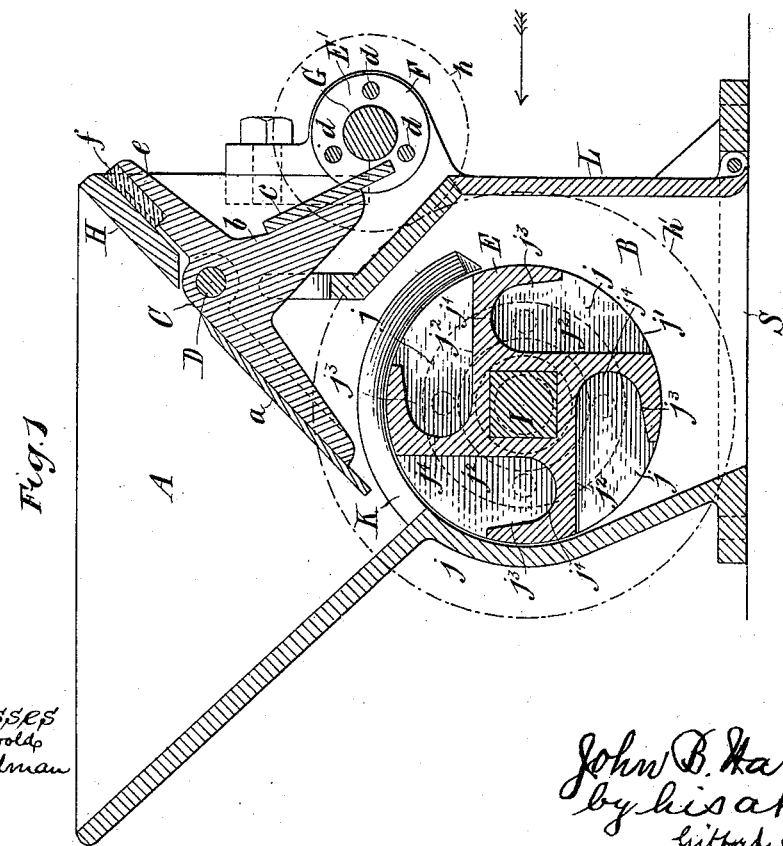
Witnesses
Inventor
John B. Waring
by his attorneys
Gifford & Brown

UNITED STATES PATENT OFFICE.

JOHN B. WARING, OF NEW YORK, N. Y.

FEEDER FOR PULVERIZING-MACHINES.

SPECIFICATION forming part of Letters Patent No. 357,435, dated February 8, 1887.

Application filed June 16, 1886. Serial No. 205,366. (No model.)

*To all whom it may concern:*

Be it known that I, JOHN B. WARING, of New York, in the county of New York and State of New York, have invented a certain new and useful Improvement in Feeders for Pulverizing-Machines, of which the following is a specification.

I will describe in detail a feeder embodying my improvement, and then point out the novel features in the claims.

In the accompanying drawings, Figure 1 is a vertical section taken on the dotted line $x\ x$ of Fig. 2. Fig. 2 is a front elevation looking in the direction of the arrow, Fig. 1.

Similar letters of reference designate corresponding parts in both figures.

A designates a hopper for receiving ore, mineral, or other substance to be fed to a pulverizing-machine. This hopper will preferably be made of metal. Below the hopper is a chamber, B. The walls of the hopper and chamber constitute the main frame of the feeder.

C designates a rocking platform mounted upon a rock-shaft, D, which is journaled in the side walls of the hopper A. This platform is arranged at an angle, and it is intended when in use to have a constant rocking motion imparted to it for the purpose of assisting in the delivery of the material to be fed to a feed-regulating device, E.

Upon the face of the platform C, and secured to it in a suitable manner, is an apron, $a$, which may be made of steel. This apron may be renewed from time to time, as required. Extending forwardly and downwardly from the platform is an arm, $b$, which is made integral therewith. This arm has secured to one side a plate, $c$. A rocking or shaking motion is imparted to the platform C by means of a shaker, E′, comprising pins $d$, extending between rings F, mounted rigidly upon a rotary shaft, G, journaled in portions of the side frame of the feeder. I have shown but three of the pins $d$ arranged between the rings F in the position of apices of an equilateral triangle; but I may use any desired number of such pins. When the shaft G is rotated, the pins $d$ are successively brought into contact with the plate $c$ on the arm $b$ of the platform C, whereby a rocking motion is imparted to said platform. When one of the pins $d$ has passed beyond the end of the plate $c$, such plate is returned by the gravity of the platform C to a position to be struck by the next pin $d$, and so on.

A shelf, H, extends at an angle approximating that of the platform C between the side walls of the hopper A, and acts as a stop to prevent the platform C from being rocked too far by gravity. An arm, $e$, upon the platform extends beneath this shelf, and its upper end is preferably recessed to accommodate a bumper, $f$, which may be of leather, rubber, or analogous material. When the platform is being moved by gravity, the bumper $f$ will be brought into contact with the shelf H, and the movement of the platform thereby stopped without undue jarring or wear and tear of the parts.

Motion is imparted to the shaft G by means of a belt upon a pulley, $g$, mounted on said shaft. Upon the end of the shaft G, opposite said pulley, is mounted a gear-wheel, $h$, which meshes with another gear-wheel, $h'$, mounted upon a shaft, I, extending through the side walls of the chamber B, and journaled in suitable bearings, $i$, thereon. Said bearings, as here shown, consist of metal plates secured to the outside of the frame of the feeder by bolts. They may, therefore, be detached from the feeder, if desirable. The portion of the shaft I which extends through the feed-regulating device E is squared; but those portions which extend through the side portions of the frame and the bearings are cylindrical. If it is desired to take out the shaft, one of the bearings $i$ is removed. The shaft may then be drawn through, the openings in the side portions of the frame being large enough to admit of this.

Within the chamber B, and rigidly mounted upon the shaft I, is the feed-regulating device E. This device consists of a roller comprising, as shown, four pockets or receptacles, $j$, for material to be fed, and circular end pieces or flanges, $j'$. The walls of the pockets extend between the end pieces or flanges, $j'$. The inner walls, $j^2$, of alternate pockets $j$ are approximately parallel with each other, and the inner walls of the intermediate pockets are at right angles thereto. The outer walls, $j^3$, of the pockets, as shown, flare somewhat as they extend outwardly. The inner and outer walls are joined by curved surfaces $j^4$.

It will be seen that the circumference of the feed-regulating device E rotates in close proximity to one of the side walls of the chamber B, and that said wall is curved for a distance above the axis of the feed-regulating device to conform to the arc of said feed-regulating device. As the shaking platform extends nearly to the said curved wall, it is apparent that material from the hopper cannot pass downwardly between such wall of the chamber and the feed-regulating device. The construction and arrangement of the pockets j are such that they are tangential to the axis of rotation of the feed-regulating device, and rotate with their mouths in the direction of rotation of the same. They are therefore severally vertical with their mouths upwardly when passing the curved side wall of the chamber B.

When the feeder is in use, the feed-regulating device E is constantly rotated and the pockets j are successively brought beneath the lower extremity of the apron a upon the platform C and receive a portion of material to be fed. The quantity of material which the feed-regulating device shall feed to the pulverizer may be regulated by varying the speed with which the feed-regulating device is rotated. This will preferably be accomplished by varying the relative sizes of the gear-wheels h h'. The pockets being equidistant apart and of the same size will each receive approximately the same quantity of material, so that the feed to the pulverizing-machine will be uniform and occur at regular intervals. By this means clogging or uneven working of the pulverizer may be avoided. Curved guards K, having their upper surfaces inclined downwardly, extend over the peripheries of the circular end pieces or flanges, j'. These guards are rigidly affixed to the side walls of the feeder, and prevent the material being fed from falling down at the ends of the feed-regulating device E.

The chamber B is made large enough to allow of the feed-regulating device E being dropped down below the guards K for the purpose of inserting or removing it. When so dropped down, the shaft I is first to be removed, as described. The rear wall of the chamber B is provided with a door, L, hinged at its lower end to the frame, through which the feed-regulating device E may be inspected.

The bottom of the chamber is, as at S, open to admit of the passage of material to the pulverizer. This opening is large enough to admit of the insertion and removal of the feed-regulating device E.

What I claim as my invention, and desire to secure by Letters Patent, is—

1. In a feeder, the combination of a hopper, a shaking platform, a chamber provided with a curved side wall, and a rotary feed-regulating device rotating in close proximity to said curved side wall, said feed-regulating device being provided with pockets arranged tangentially to the axis of rotation, and being severally vertical with their mouths upward when passing said side wall, substantially as specified.

2. The combination of a hopper provided with a shaking platform, of a roller provided with pockets and circular end pieces and constituting a feed-regulating device, and guards extending over said circular end pieces, substantially as specified.

3. The combination, with the platform C, provided with the arm b, of the shaker E', comprising the pins d and rings F, the shelf H, and the bumper f, substantially as specified.

J. B. WARING.

Witnesses:
JAMES D. GRISWOLD,
JAS. R. BOWEN.